March 18, 1958     F. T. MULLIKIN     2,827,600
ADJUSTABLE CAPACITOR
Filed July 16, 1954
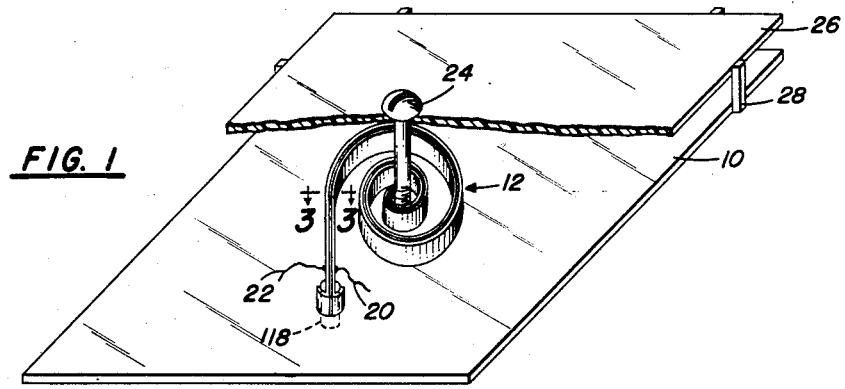
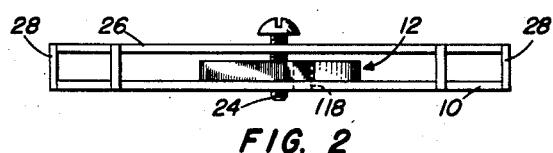
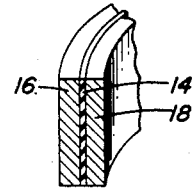
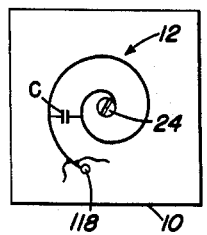
FIG. 4
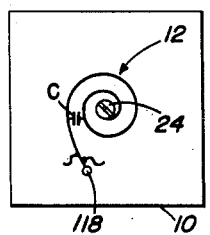
FIG. 5
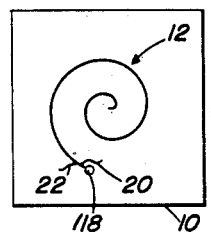
FIG. 6
INVENTOR
FORREST T. MULLIKIN
BY
*Wayne M. Hart*
ATTORNEY

United States Patent Office 2,827,600
Patented Mar. 18, 1958

2,827,600

ADJUSTABLE CAPACITOR

Forrest T. Mullikin, Washington, D. C., assignor to ACF Industries, Incorporated, New York, N. Y., a corporation of New Jersey Application July 16, 1954, Serial No. 443,840

1 Claim. (Cl. 317—248)

This invention relates to electrical components, particularly capacitors.

Reasonably reliable capacitors are available at the present time. It is commonly known, however, that at elevated temperatures their capacitance varies. The heat causing such temperature elevation is not only ambient, externally caused, but also, caused by use of the capacitor. That is, there are heat losses within the dielectric. Accordingly, it is not practical in most capacitor uses to try to maintain the capacitor at a fixed temperature level. It is an object of this invention to provide an inexpensive capacitor which is temperature compensating, that is, when the capacitance varies due to heat changes, a corrective capacitance is automatically applied.

The primary cause of capacitance variation with temperature is the imperfection of the dielectric material. There have been efforts to improve the dielectric materials, and new materials have been discovered and formulated. The invention solves the problem of making a stable capacitor at a low cost by allowing the capacitance to vary with temperature changes, and providing a corrective increment of capacitance. This increment varies with temperature, as does the unwanted deviation from the capacitance at room temperature. Therefore, a more specific object of the invention is to provide a capacitor unit made of two electrically conducting plates, e. g. flexible strips of metal bonded to the opposite faces of a flexible dielectric to form a unitary structure, the plates having different expansion coefficients so that when temperature changes, the capacitance of the unit also changes as in a usual capacitor, but so does the shape of the unit due to the bimetallic nature of it. If the unit is arcuate in form having at least one convolution, that is a fold, winding, whorl, or the like, there will be a distributive capacitance present across opposed portions of the strip. This is additive to the normal "lumped" capacitance of the metal plates and dielectric combination. When the temperature changes, the configuration of the unitary structure will be altered in such manner that the distributive capacitance across the opposed portions will be varied because the distance between the opposed portions is changed, and the capacitance is inversely proportional to that distance.

Another object of the invention is to provide in a capacitor which is temperature compensating as described previously, means to preset the capacitor unit to a selected range of operation. One of the ways of doing this is to fix one end of the unitary structure and connect the opposite end to an adjustable element such as a screw or post that fits in any of a group of apertures, or some other means to displace and hold an end of the unit. The result is that the convolution shape is varied at will, changing the entire parameter of distances between opposed portions of the convolution. This fixes the capacitance at a selected level and as the temperature changes, the convolution changes shape, thereby changing capacitance across opposed portions thereof from the initial, manually set position.

Although capacitance compensation as a function of temperature change is one of the teachings of the invention, the adjustment alone is considered an important feature. Thus, another object of the invention is to provide a capacitor unit consisting of a convoluted dielectric strip with metal films or strips on opposite surfaces thereof, with means to adjust the parameter of distances between opposed portions of the unit thereby adjusting the capacitance between these portions. This adjustment may be provided for regardless of the natures of the metal films or strips, that is, the strips may change shape in response to temperature change, but they need not necessarily behave in this manner.

A further object of the invention is to provide a temperature compensating capacitor by forming a dielectric with dissimilar expansion coefficient metals on opposite surfaces thereof in a broadly convoluted shape so that additive capacitances are present across opposed portions of the unit, and the convoluted shape is variable with temperature change. By leaving one end of the unit free to be displaced, high responses to temperature changes are realized.

Other objects and important features, such as an insulating material guide for the capacitor unit, will become apparent in following the description of the illustrated forms of the inventon. In the drawing:

Figure 1 is a perspective view of one of the capacitors made by practice of the invention;

Figure 2 is a side view of the capacitor of Figure 1;

Figure 3 is an enlarged sectional view taken on the line 3—3 of Figure 1, showing the construction of the capacitor unit;

Figure 4 is a schematic plan view of one of the capacitors, illustrating a capacitance between opposed portions of the capacitor unit;

Figure 5 is another schematic view illustrating the change of capacitance which takes place when the convoluted unit is adjusted, either manually, by thermal response or both; and Figure 6 is a plan view of the basic capacitor with its mount-base.

A considerable amount of effort has been directed toward improving and discovering new dielectric materials in order to enhance the characteristics of capacitors. As a result, ceramic capacitors have been improved appreciably, as have rolled and folded capacitors. However, even the best capacitors presently available vary in capacitance with changes in temperature due to dielectric frailties. The mode of solution of this problem by the instant invention allows the capacitor to vary with temperature, but automatically provides a corrective capacitance as the temperature of the capacitor unit changes.

In the drawing there is a base 10 of any known insulating material such as ceramic, plastic or others. The main function of base 10 is to support the capacitor unit 12 which is in appearance somewhat similar to a rolled capacitor. It consists of a flexible dielectric strip 14 selected from the group of dielectric materials commonly used in rolled or folded capacitors. Various grades and kinds of paper may be used or films of plastic, as are quite common at the present time. The capacitor plates 16 and 18 are formed of strips or films bonded to opposite surfaces of dielectric 14, being held in place by any common adhesive, depending on the selection of dielectric and metals thereby to form the unitary structure 12. If the metal parts 16 and 18 are films, they may be painted or sprayed directly upon the dielectric, with an ingredient of the paint acting as the adhesive. If the parts 16 and 18 are metal strips such as brass and copper, respectively, and a thermo setting plastic is chosen as the dielectric strip 14, application of heat will cause the plastic to act as the adhesive. Or, the metal to dielectric bond may be made by applying a film of glue to the confronting surfaces. These techniques are known in the art of rolled capacitor manufacture and are adapted in the assembly of structure 12. The important point is that the metal of plate 16 has a different coefficient of expansion from that of the metal of plate 18. Together they coact to act as a bimetallic strip which responds by deformation to temperature changes, since they are each bonded to the dielectric strip 14 and one metal expands at a greater rate than the other.

The unitary structure 12 is secured at one end, as by fixing it to a binding post 118 on base 10, and left at its opposite end to enjoy unrestricted freedom of movement relative thereto, as dictated by temperature changes (Figure 6). Leads 20 and 22 are connected to the capacitor plates 16 and 18, and they adapted to be connected to external circuitry.

Figures 1–5 relate to the capacitor of Figure 6 with the addition of various refinements. At the inner end of unit 12 there is a manually adjustable element as screw 24, mounted tightly in a threaded bore in base 10. The screw may be of insulating material, or metal with provision made to assure that strips 16 and 18 will not be bridged. This may be accomplished by securing only one strip to the screw or by wrapping insulation around the screw shank and securing it, then connecting the unit 12 inner end to the insulation. In any case, by adjusting the screw, the shape of unit 12 may be altered. In this regard, compare Figures 4 and 5, which illustrate different adjustments of screw 24.

An upper plate 26 of insulating material may be superposed over base 10 to act as a guide for unit 12 during its movements, and as a protector for the unit. This is an optional feature, and when used, it may accommodate screw 24, or simply permit it to pass through by having an aperture therein. Base 10 and plate 26 are held assembled by suitable means, for example, screws or posts 28 connected to each.

In operation, the "lumped" capacitance of the structure 12, due to the separation of the plates 16 and 18 by the dielectric strip 14, as in many capacitors, varies in its characteristics with temperature change. However, unitary structure 12 is arcuate being curved or bent to some configuration other than a straight line. This is defined as being convoluted or having at least one convolution so that portions of the capacitor structure 12 are spaced a finite distance from each other. The result is that a parameter of distributed capacitance is present across the opposed elemental portions of the structure 12, and this distributed capacitance is additive to the "lumped" capacitances of the structure.

When there is a change in the radius of curvature of structure 12, as by thermal response of the bimetal plates 16 and 18, or by manual adjustment of screw 24, or both, the distance between the opposed portions of structure 12 is changed, and this results in a change of additive distributive capacitance C because such capacitance is inversely proportional to the distance. In Figures 4 and 5 this distributed capacitance is illustrated by the single capacitance C which is representative of the entire parameter that is established upon adjustment of the shape of structure 12.

It is not essential that the structure 12 be bimetallic. If the capacitor is constructed in such a way that it does not change in shape in response to temperature change, the capacitor is then merely an adjustable one, where the amount of corrective distributed capacitance C is manually selected, without automatic correction. Alternatively, the manual adjustment may be omitted, and the structure 12 be made bimetallic so that it responds only to temperature change. The benefit derived in having both the thermal and manual responses is that it is possible to select the capacitance range over which thermal responses will be operative. Adjustment of screw 24 in the illustrated embodiments provides for this.

It is understood that various modifications and changes may be made without departing from the following claim.

What is claimed is:

An adjustable capacitor comprising a flat strip of solid dielectric formed as an involutional spiral, an outer electrode consisting of a conductive strip bonded to the convex surface of said dielectric strip, an inner electrode consisting of a conductive strip bonded to the concave surface of said dielectric strip, the shape of said involutional dielectric providing complete separation between the unbonded faces of said electrodes, the respective electrodes being of materials having different temperature coefficients of expansion, whereby a variation in temperature causes a change in the spacing between said unbonded faces to alter the capacitive reactance inherent therebetween, and manually adjustable means for distorting the shape of said spiral so as to adjust the average spacing between said unbonded faces so as to alter the capacitive reactance inherent therebetween.

References Cited in the file of this patent

UNITED STATES PATENTS

| | | |
|---|---|---|
| 965,992 | Dean | Aug. 2, 1910 |
| 1,551,661 | Hill | Sept. 1, 1925 |
| 2,151,752 | Ellis | Mar. 28, 1939 |
| 2,591,644 | Wadsworth | Apr. 1, 1952 |

FOREIGN PATENTS

| | | |
|---|---|---|
| 216,038 | Great Britain | May 22, 1924 |
| 1,080,267 | France | May 26, 1954 |